United States Patent
Feng

(10) Patent No.: US 12,090,405 B2
(45) Date of Patent: Sep. 17, 2024

(54) VIRTUAL OBJECT INTERACTION METHOD AND RELATED APPARATUS

(71) Applicant: Tencent Technology (Shenzhen) Company Limited, Shenzhen (CN)

(72) Inventor: Qiyao Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 215 days.

(21) Appl. No.: 17/743,291

(22) Filed: May 12, 2022

(65) Prior Publication Data
US 2022/0266143 A1 Aug. 25, 2022

Related U.S. Application Data

(63) Continuation of application No. PCT/CN2021/094270, filed on May 18, 2021.

(51) Int. Cl.
| A63F 13/53 | (2014.01) |
| A63F 13/52 | (2014.01) |
| A63F 13/56 | (2014.01) |
| A63F 13/822 | (2014.01) |

(52) U.S. Cl.
CPC .............. *A63F 13/56* (2014.09); *A63F 13/52* (2014.09); *A63F 13/53* (2014.09); *A63F 13/822* (2014.09)

(58) Field of Classification Search
None
See application file for complete search history.

(56) References Cited

U.S. PATENT DOCUMENTS

| 2014/0094317 A1* | 4/2014 | Takagi | A63F 13/35 463/42 |
| 2014/0235334 A1 | 8/2014 | Tarumi | |

FOREIGN PATENT DOCUMENTS

| CN | 108619721 A | 10/2018 |
| CN | 108786114 A | 11/2018 |
| CN | 110711382 A | 1/2020 |

(Continued)

OTHER PUBLICATIONS

CN Pub. 110711382A English Translation via Google Patents, Jan. 21, 2020 (Year: 2020).*

(Continued)

*Primary Examiner* — Damon J Pierce
(74) *Attorney, Agent, or Firm* — Morgan, Lewis & Bockius LLP

(57) ABSTRACT

This application discloses a virtual object interaction method performed by a computer device. A target virtual scene is obtained and displayed, where the target virtual scene includes a virtual object and a target interaction region, and the target interaction region has a valid time and randomly generated at a location in the target virtual scene; an interaction value is determined in response to a target operation of the virtual object occupying the target interaction region; and the target interaction region is then updated in the target virtual scene when an existence time of the target interaction region reaches the valid time and the interaction value is lower than a preset value. Because virtual object interaction is only guided by switching the target interaction region in a virtual scene and a large quantity of virtual elements are not introduced, occupancy of resources in the virtual element interaction process is reduced.

18 Claims, 12 Drawing Sheets

(56) References Cited

FOREIGN PATENT DOCUMENTS

| CN | 110898428 A | 3/2020 |
|---|---|---|
| CN | 111672125 A | 9/2020 |

OTHER PUBLICATIONS

Tencent Technology, WO, PCT/CN2021/094270, Sep. 29, 2022, 4 pgs.
Tencent Technology, Iprp, PCT/CN2021/094270, Dec. 13, 2022, 5 pgs.
Tencent Technology, ISR, PCT/CN2021/094270, Aug. 17, 2021, 2 pgs.

\* cited by examiner

VIRTUAL OBJECT INTERACTION METHOD AND RELATED APPARATUS

CROSS-REFERENCE TO RELATED APPLICATIONS

This application is a continuation application of PCT Patent Application No. PCT/CN2021/094270, entitled "METHOD FOR INTERACTION WITH VIRTUAL OBJECT AND RELATED DEVICE" filed on May 18, 2021, which claims priority to Chinese Patent Application No. 202010523186.4, filed with the State Intellectual Property Office of the People's Republic of China on Jun. 10, 2020, and entitled "VIRTUAL OBJECT INTERACTION METHOD AND RELATED APPARATUS", all of which are incorporated herein by reference in their entirety.

FIELD OF THE TECHNOLOGY

This application relates to the field of computer technologies, and in particular, to virtual object interaction.

BACKGROUND OF THE DISCLOSURE

With the development of Internet technologies, more and more game applications appear in people's life, and how to increase richness in a virtual scene of a game has become a difficult problem.

Generally, in a target virtual scene, richness of the virtual scene can be improved by adding virtual elements, for example, adding terrain and weather.

However, only by adding the virtual elements, a system space occupied by the game application becomes larger and larger, and a frozen phenomenon is easy to occur in a multi-person interaction scene, so that stability of a virtual element interaction process is affected.

SUMMARY

In view of this, this application provides a virtual object interaction method, which can effectively avoid scene freezing caused by adding a large quantity of virtual elements, and improve stability of a virtual object interaction process.

According to one aspect, an embodiment of this application provides a virtual object interaction method, applicable to a system or a program including a function of virtual object interaction in a computer device (e.g., a smartphone), the method specifically including: displaying a target virtual scene for an adversarial game between at least two virtual objects, the target virtual scene comprising a target interaction region;

increasing an interaction value associated with a first virtual object of the at least two virtual objects in response to the first virtual object occupying the target interaction region; and determining a game outcome based on the interaction value associated with the first virtual object.

According to another aspect, an embodiment of this application provides a computer device, including: a memory, a transceiver, a processor, and a bus system, the memory being configured to store program code, and the processor being configured to perform the virtual object interaction method in the foregoing aspects according to instructions in the program code.

According to another aspect, an embodiment of this application provides a non-transitory computer-readable storage medium, storing a computer program, the computer program being configured to perform the virtual object interaction method in the foregoing aspects.

According to still another aspect, an embodiment of this application further provides a computer program product including instructions, the computer program product, when run on a computer, causing the computer to perform the virtual object interaction method in the foregoing aspects.

As can be seen from the foregoing technical solutions, the embodiments of this application have the following advantages:

A target virtual scene for an adversarial game between at least two virtual objects is obtained and displayed, where the target virtual scene includes a target interaction region; an interaction value is then increased in response to a target operation of a first virtual object occupying the target interaction region; and a game outcome based on the interaction value associated with the first virtual object is then determined, e.g., the target interaction region is further updated in the target virtual scene when an existence time of the target interaction region reaches the valid time and the interaction value is lower than a preset value. In this way, a continuous virtual element interaction process is achieved. Because virtual object interaction is only guided by switching the target interaction region in a virtual scene and a large quantity of virtual elements are not introduced, occupancy of resources in the virtual element interaction process is reduced, and stability of the virtual object interaction is improved.

BRIEF DESCRIPTION OF THE DRAWINGS

To describe the technical solutions in the embodiments of this application or in the related art more clearly, the following briefly describes the accompanying drawings required for describing the embodiments or the related art. Apparently, the accompanying drawings in the following descriptions show merely the embodiments of this application, and a person of ordinary skill in the art may still derive other drawings from the accompanying drawings without creative efforts.

DESCRIPTION OF EMBODIMENTS

Embodiments of this application provide a virtual object interaction method and a related apparatus, which may be applicable to a system or a program including a function of virtual object interaction in a terminal device. The method obtains a target virtual scene for an adversarial game between at least two virtual objects, where the target virtual scene includes a first virtual object and a target interaction region, and the target interaction region has a valid time; determines (e.g., increases) an interaction value in response to a target operation of the virtual object in the target interaction region; and determines a game outcome based on the interaction value associated with the first virtual object, e.g., updates the target interaction region in the target virtual scene when an existence time of the target interaction region reaches the valid time and the interaction value is lower than a preset value. In this way, a continuous virtual element interaction process is achieved. Because virtual object interaction is only guided by switching the target interaction region in a virtual scene and a large quantity of virtual elements are not introduced, occupancy of resources in the virtual element interaction process is reduced, and stability of the virtual object interaction is improved.

The terms such as "first", "second", "third", and "fourth" (if any) in the specification and claims of this application and in the accompanying drawings are used for distinguishing between similar objects and not necessarily used for describing any particular order or sequence. Data used in this way may be interchanged in an appropriate case, so that the embodiments of this application described herein can be implemented in a sequence other than the sequence illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Figure 1:
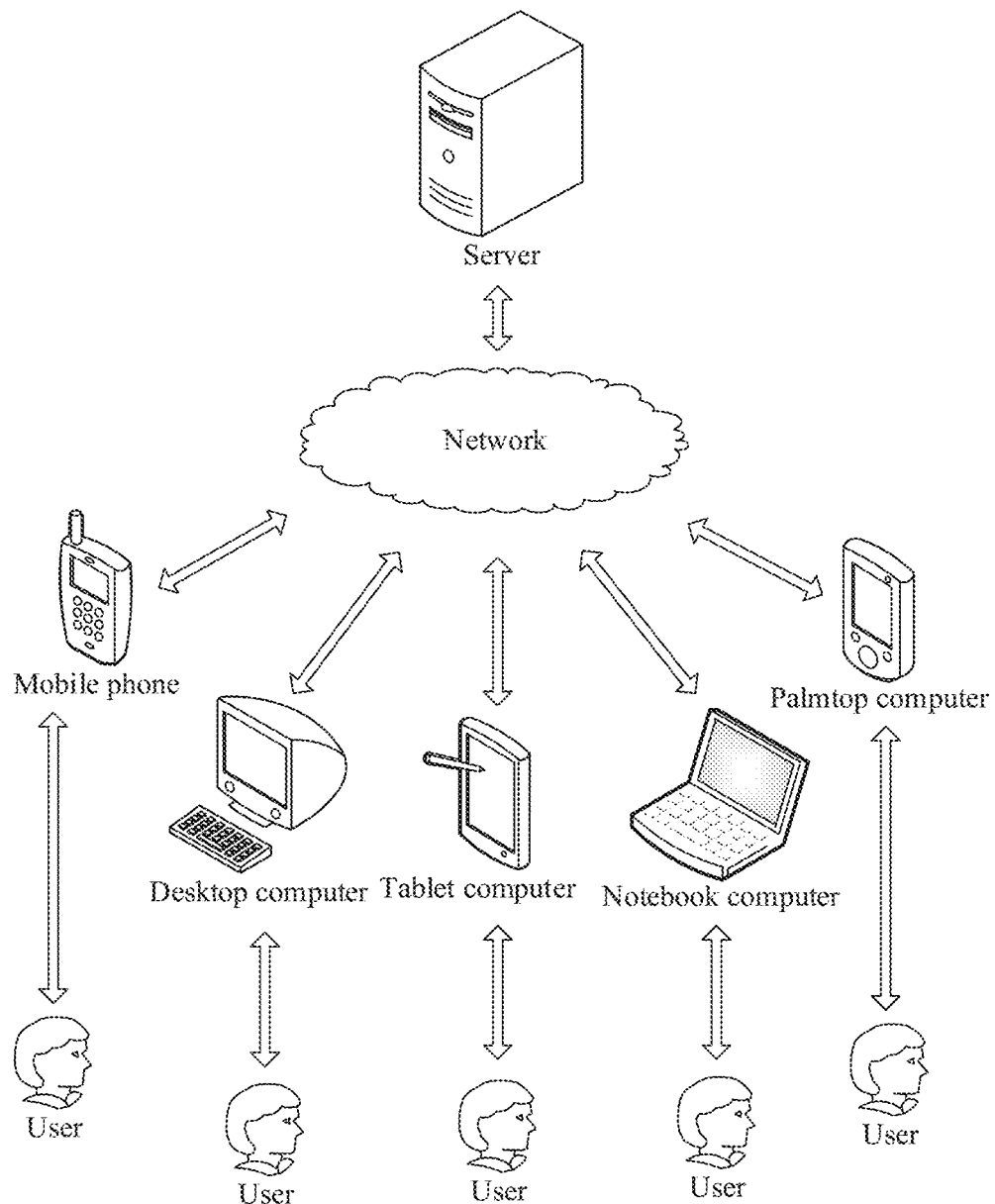
FIG. 1 is a diagram of a network architecture of running a virtual object interaction system.

The virtual object interaction method provided by this application may be applicable to the system or the program including the function of virtual object interaction in the terminal device, for example, a media content platform. Specifically, the virtual object interaction method may be implemented by a virtual object interaction system, and the virtual object interaction system may be, for example, a network architecture shown in FIG. 1. FIG. 1 is a diagram of a network architecture of running a virtual object interaction system. As can be seen in the figure, the virtual object interaction system may provide virtual object interaction with a plurality of information sources, and a terminal establishes connection with a server through a network, and sends an operation instruction to the server, thereby controlling virtual object interaction in a virtual scene. FIG. 1 shows a plurality of terminal devices. In an actual scene, there may be more or less types of terminal devices participating in a virtual object interaction process, and a specific quantity and type depend on the actual scene and are not limited herein. In addition, FIG. 1 shows one server, but a plurality of servers may also participate in the actual scene, especially in a scene of multi-content application interaction, and a specific quantity of servers depends on the actual scene.

In this embodiment, the server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application.

The virtual object interaction method provided in this embodiment may alternatively be performed offline, that is, without participation of a server, for example, for a stand-alone game, a terminal is locally connected with another terminal, to perform a virtual object interaction process between terminals.

The virtual object interaction method may run on the foregoing terminal device, for example, a mobile terminal installed with a media content platform application, run on a server, or run on a third-party device to provide virtual object interaction, so as to obtain a processing result of virtual object interaction of the information sources. A specific virtual object interaction system may run on the above device in a form of a program, run as a system component in the above device, or be used as one of cloud service programs. A specific active mode depends on an actual scene, which is not limited herein.

Figure 2:
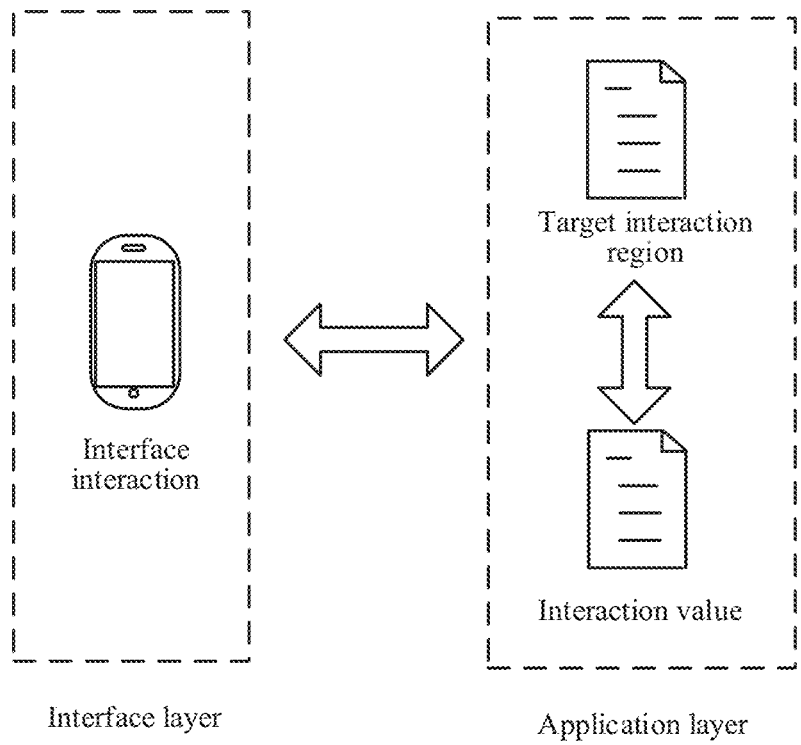
FIG. 2 is an architectural diagram of a procedure of virtual object interaction according to an embodiment of this application.

To resolve the problems such as freezing caused by adding virtual elements and provide a richer interaction mode, this application provides a virtual object interaction method, and the method is applicable to a procedure framework of virtual object interaction shown in FIG. 2. FIG. 2 is an architectural diagram of a procedure of virtual object interaction according to an embodiment of this application, which mainly involves interaction between an interface layer and an application layer. The interface layer is used for receiving an operation by a user on a virtual object, while the application layer performs corresponding scene switching based on the operation by the user on the virtual object. In this application, switching of target interaction regions and determining of an interaction value are involved, so as to realize dynamic change of a scene during a virtual object interaction process and improve richness of the virtual scene interaction process.

The method provided by this application may be writing of a program, to be used as one type of processing logic in a hardware system, or be used as a virtual object interaction apparatus, and implement the foregoing processing logic in an integrated or externally connected manner. As an implementation, the virtual object interaction apparatus obtains a target virtual scene for an adversarial game between at least two virtual objects, where the target virtual scene includes a first virtual object and a target interaction region, and the target interaction region has a valid time; determines (e.g., increases) an interaction value in response to a target operation of the virtual object in the target interaction region; and determines a game outcome based on the interaction value associated with the first virtual object, e.g., updates the target interaction region in the target virtual scene when an existence time of the target interaction region reaches the valid time and the interaction value is lower than a preset value. In this way, a continuous virtual element interaction process is achieved. Because virtual object interaction is only guided by switching the target interaction region in a virtual scene and a large quantity of virtual elements are not introduced, occupancy of resources in the virtual element interaction process is reduced, and stability of the virtual object interaction is improved.

Figure 3:
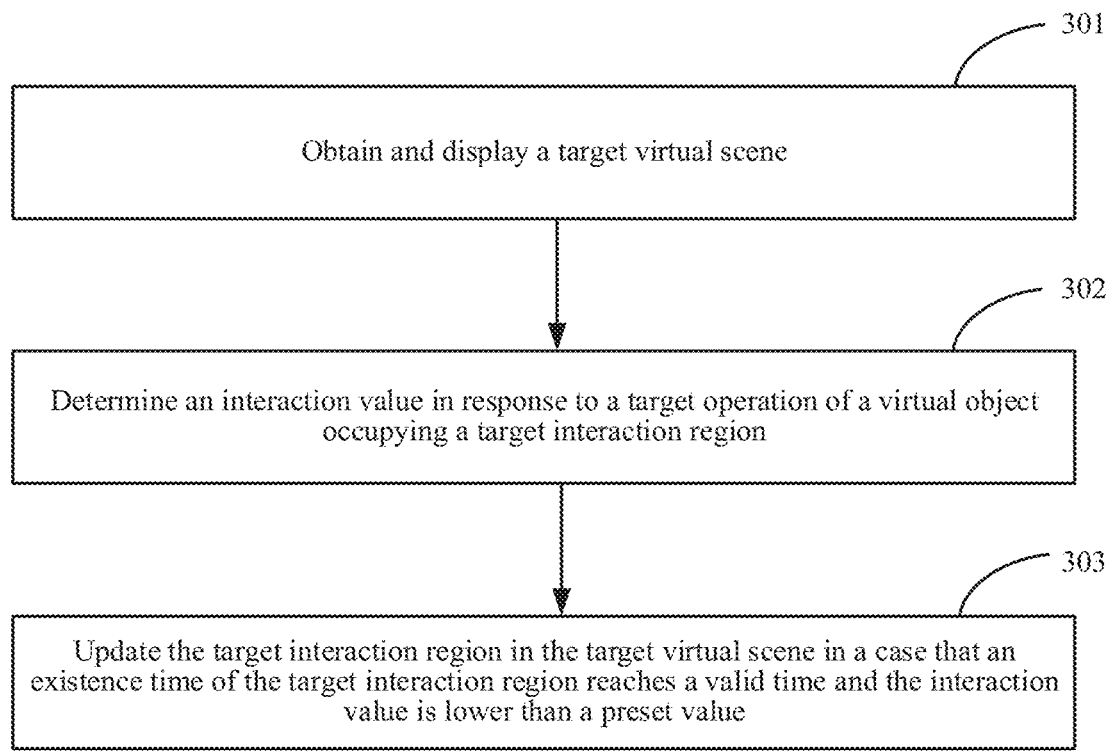
FIG. 3 is a flowchart of a virtual object interaction method according to an embodiment of this application.

With reference to the foregoing procedure and architecture, the virtual object interaction method in this application is described below. FIG. 3 is a flowchart of a virtual object interaction method according to an embodiment of this application. The embodiment corresponding to FIG. 3 may be implemented by using a virtual object interaction device, the virtual object interaction device may implement the virtual object interaction method through the block flowchart shown in FIG. 2, and the virtual object interaction device may be the foregoing terminal device or server. As shown in FIG. 3, the method includes the following steps.

301. Obtain and display a target virtual scene.

In this embodiment, the target virtual scene includes virtual objects and a target interaction region, and the target interaction region is used for guiding interaction between the virtual objects. The virtual objects may belong to different camps, the camps are parties to which the virtual objects belong, and the virtual objects of different camps may perform element interaction, for example, deduction of hit point values after firefight. The target interaction region is a dynamic region, that is, the target interaction region may be randomly generated in the target virtual scene, and the virtual objects need to move to the region to obtain corresponding virtual rewards, to obtain corresponding interaction values.

The target interaction region has a valid time. Specifically, the valid time may be a duration of which the target interaction region exists. When the target virtual scene starts to be obtained, an updating countdown of the target interaction region is enabled based on the valid time. For example, the countdown starts from the duration, and the target interaction region is considered to be in the valid time until the countdown returns to zero. During the valid time, the virtual objects need to enter the target interaction region to obtain the interaction values. If an existence time of the target interaction region reaches the valid time (the countdown returns to zero), the target interaction region may disappear, and may be refreshed and appear in another position in the target virtual scene based on a mechanism. In this case, the interaction values cannot be obtained on positions of the virtual objects in an original target interaction region.

In another possible scene, the valid time may alternatively be a time period during which the target interaction region exists after the virtual objects enter the target interaction region. That is, when the virtual objects enter the target interaction region, display of the target interaction region starts, based on the countdown of the valid time, to be canceled or be further refreshed after the countdown ends.

Figure 4:
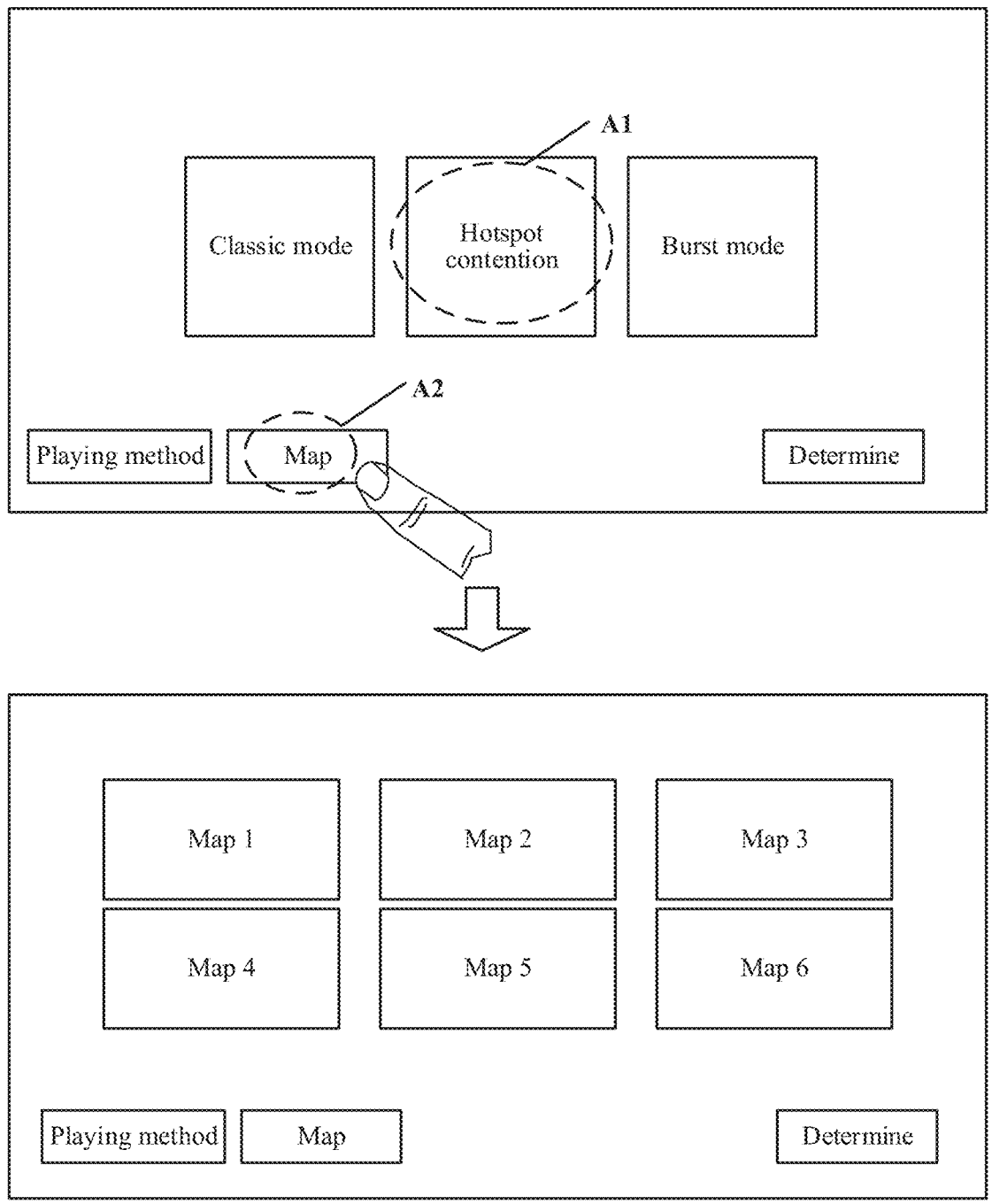
FIG. 4 is a schematic diagram of a scene of virtual object interaction according to an embodiment of this application.

In some embodiments, the target virtual scene may be determined through a candidate virtual scene, for example, a process of map selection. Specifically, the candidate virtual scene is first determined in response to a selection instruction; a target hotspot is then generated based on the candidate virtual scene; the target interaction region is then generated according to the target hotspot; and the target interaction region is further deployed in the candidate virtual scene based on the target hotspot, to determine the target virtual scene. In a specific scene, FIG. 4 is a schematic diagram of a scene of virtual object interaction according to an embodiment of this application. The figure shows a hotspot contention mode A1 and a map button A2 used for instructing to generate a target interaction region. After a user clicks the hotspot contention mode A1, a background may invoke a corresponding target interaction region generation rule. Further, the user may obtain a plurality of different map selections by clicking the map button A2. After the user finishes selecting, the background may invoke a corresponding candidate virtual scene and combine the candidate virtual scene with the target interaction region, so as to obtain a target virtual scene used for virtual object interaction, and thus improve richness of the target virtual scene.

Figure 5:
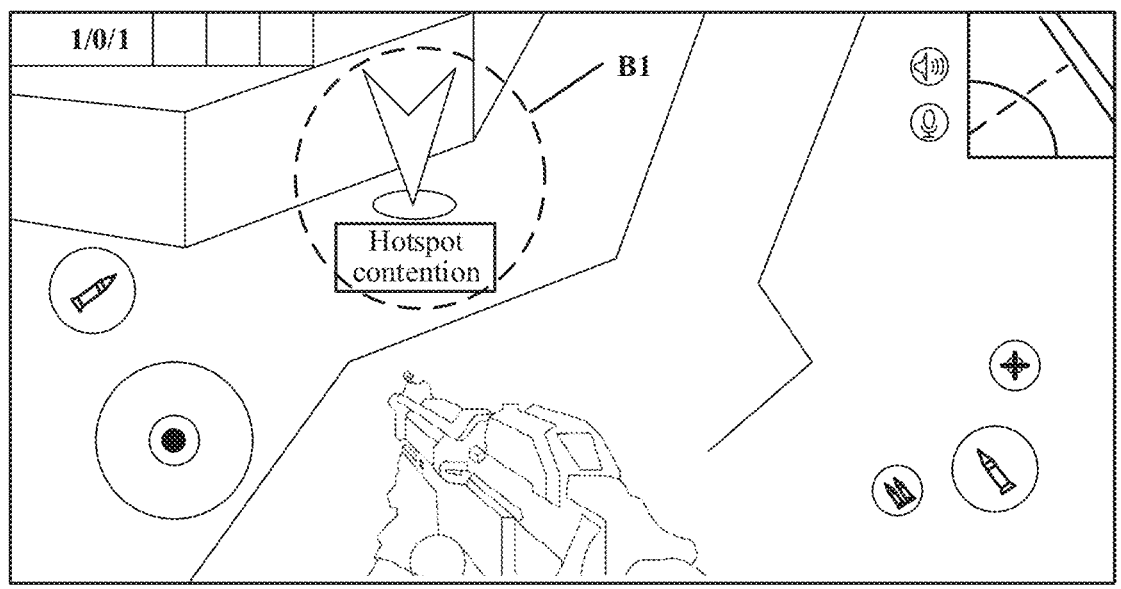
FIG. 5 is a schematic diagram of another scene of virtual object interaction according to an embodiment of this application.

In a possible scene, a target hotspot used for indicating a center of a target interaction region may be displayed in a target virtual scene. FIG. 5 is a schematic diagram of another scene of virtual object interaction according to an embodiment of this application. The figure shows a virtual element representation B1 of the target hotspot, where the target hotspot B1 may indicate a direction of the target interaction region relative to a virtual object, that is, the virtual object has not yet reached a vicinity of the target interaction region, but may travel according to the direction indicated by the target hotspot B1. In addition, the target hotspot B1 may alternatively use a dynamic virtual element, that is, an action, for example, jumping in a center of the hotspot, that may attract player's attention.

A process of generating prompt information based on a target hotspot may include a prompt direction or a distance, and indicates the prompt direction or the distance on an interface. Specifically, the prompt information is first generated based on the target hotspot, where the prompt information is used for indicating a direction or a distance; and a second virtual element in a target virtual scene is then updated according to the prompt information, where the second virtual element is used for guiding a virtual object to approach a target interaction region. For example, the second virtual element may be a guide arrow indicating a travel direction of the virtual object.

Figure 6:
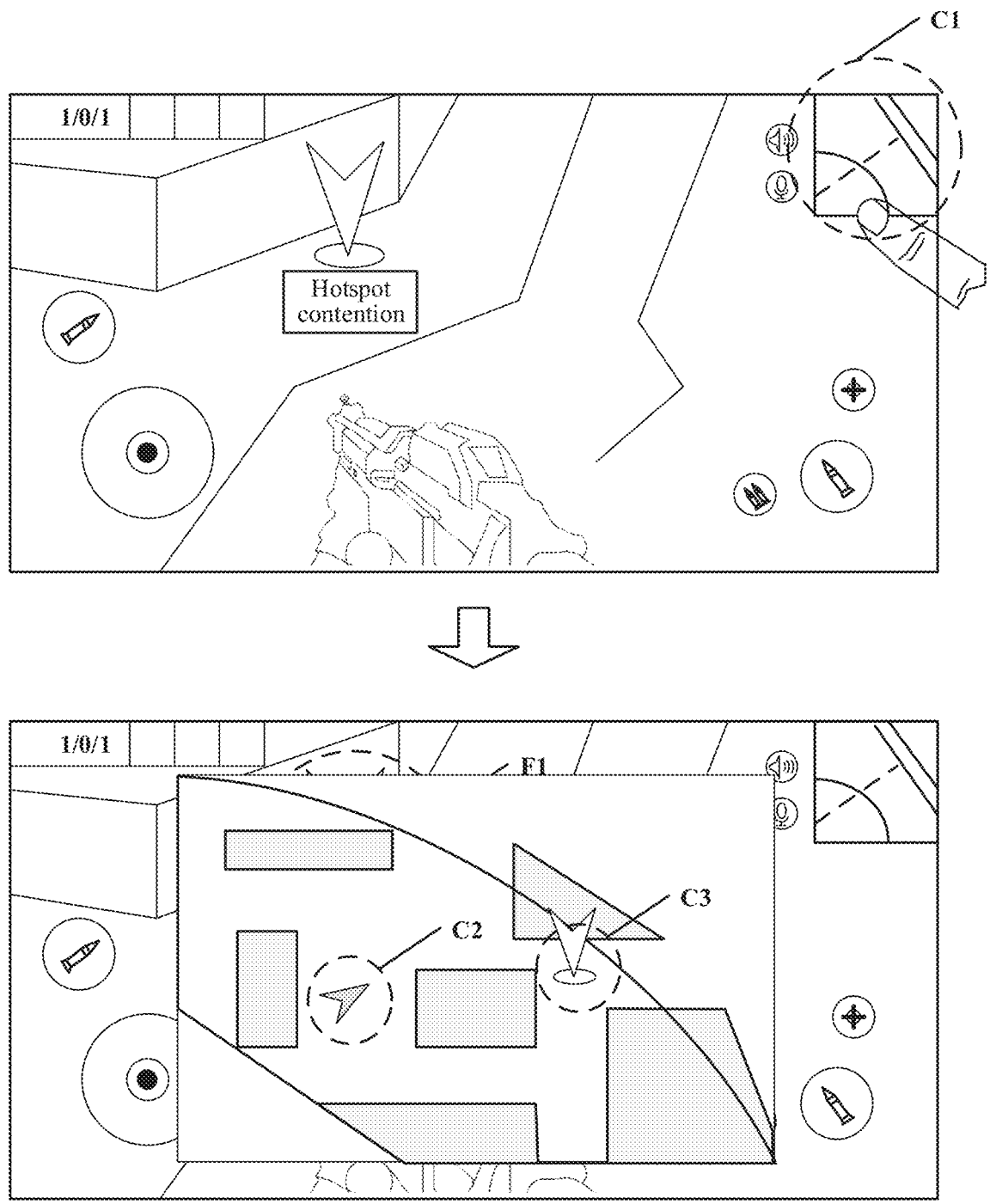
FIG. 6 is a schematic diagram of another scene of virtual object interaction according to an embodiment of this application.

In some embodiments, the prompt information may alternatively be displayed through a third virtual element (a minimap), that is, position information of a target hotspot in a third virtual element is first determined, where the third virtual element is used for guiding a virtual object to approach a target interaction region; position coordinates of the virtual object in the third virtual element are then determined; and the prompt information is further determined based on the position information and the position coordinates. In a possible scene, FIG. 6 is a schematic diagram of another scene of virtual object interaction according to an embodiment of this application. The user may click a minimap C1 to invoke specific information of the minimap, that is, display a position C2 of a virtual object and a position of a target hotspot C3 in the minimap; generate corresponding prompt information according to a connecting line between the two positions, that is, a direction of the target hotspot C3 relative to the position C2 of the virtual object; and convert a distance of the target hotspot C3 relative to the position C2 of the virtual object according to a scale in the minimap, so as to guide the virtual object to travel toward the target hotspot, and thus ensure accuracy of virtual object interaction.

Figure 7:
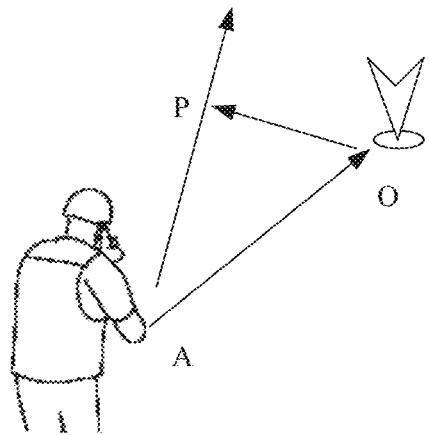
FIG. 7 is a schematic diagram of another scene of virtual object interaction according to an embodiment of this application.

In some embodiments, the prompt information may alternatively be determined based on a position of a virtual object relative to a target hotspot in a target virtual scene. That is, an indication direction and position coordinates of the virtual object are first determined, where the indication direction is used for indicating a first direction line toward which the virtual object faces; a second direction line is then generated based on the position coordinates and the target hotspot; and the prompt information is further generated based on the first direction line and the second direction line. Specifically, FIG. 7 is a schematic diagram of another scene of virtual object interaction according to an embodiment of this application. The figure shows a position point A of a virtual object, a position of a target hotspot O, and a position point P in a facing direction of the virtual object. To provide a position prompt of the target hotspot O to the virtual object, the virtual object A and the target hotspot O may be linked with a line AO, so as to prompt based on a direction and a length of the AO. In some scenes, a virtual object cannot travel directly along a route of the AO, that is, there may be obstacles on the route of the AO. In this case, the virtual object may be guided to travel by using the following prompts. That is, a bearing line AP is first determined on a position point P in the facing direction of the virtual object, and then a vertical line of the bearing line AP is made based on the target hotspot O, so as to obtain a directional displacement OP. Therefore, a length of the OP is a lateral movement distance, and the corresponding AP is a direction of a screen center and a distance from the screen center, namely, a longitudinal movement distance. Further, the prompt is performed with reference to virtual elements.

Figure 8:
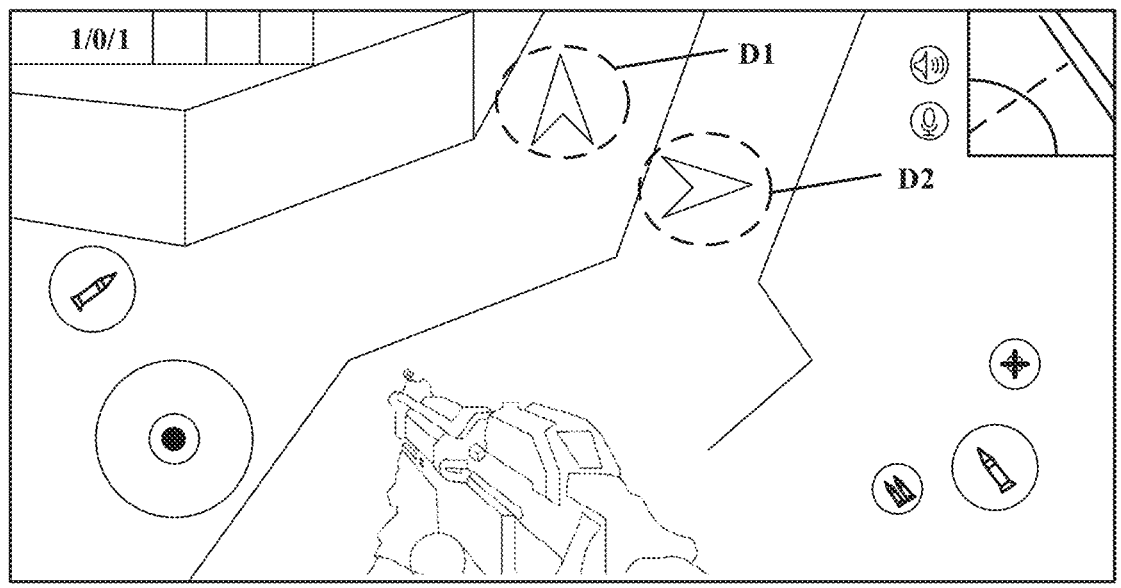
FIG. 8 is a schematic diagram of another scene of virtual object interaction according to an embodiment of this application.

In a possible scene, the prompt information shown in FIG. 7 may be displayed by using virtual elements shown in FIG. 8. FIG. 8 is a schematic diagram of another scene of virtual object interaction according to an embodiment of this application. The figure shows a lateral displacement D1 and a longitudinal displacement D2 set based on a direction, that is, a distance prompt value of the lateral displacement D1 is determined based on the AP in FIG. 7, and a distance prompt value of the longitudinal displacement D2 is determined based on the OP in FIG. 7. The direction herein is only an example, and a specific direction indication may alternatively be another direction, such as: a northeast direction, or southwest direction. The setting of a specific prompt direction depends on an actual scene. The prompt information is generated based on the position of the virtual object and the target hotspot in the target interaction region, which can ensure that the virtual object accurately travels to the target interaction region, to interact with other virtual objects, thereby improving accuracy of virtual object interaction.

302. Determine an interaction value in response to a target operation of a virtual object occupying the target interaction region.

In this embodiment, the interaction value may also be referred to as a credit, a score, or the like. A specific interaction value may be determined and obtained through occupancy information, and the occupancy information is determined based on an occupancy time of the virtual object of a single camp in the target interaction region. The occupancy time is the occupancy time of the virtual object of the single camp in the target interaction region, namely, a time of which the target interaction region exists the virtual object of the single camp. If a virtual object of another camp enters the target interaction region, occupancy is not formed. In this case, one party of virtual object needs to destroy another party, to continuously update the occupancy information, thereby promoting interaction between virtual objects. That is, the target operation is an operation that the one party maintains himself in the target interaction region.

The interaction value varies with a change of the occupancy time of the virtual object in the target interaction region. Therefore, determining of the interaction value may be varied dynamically based on the occupancy time, may specifically use a certain function relationship, for example, the occupancy time is proportional to the interaction value, that is, the interaction value increases by 10 points per 1 second of occupancy.

In another possible scene, the interaction value may alternatively be obtained based on the occupancy time and interaction data indicated by the occupancy information, where the interaction data is battle data between the virtual objects. Specifically, the interaction value increasing by 10 points per 1 second of occupancy may be set, and the interaction value increases by 5 points each time a virtual object of a different camp is eliminated. Because a process of adjusting the interaction value based on the occupancy time stops after a virtual object of a different camp enters the target interaction region, an adjustment dimension of the interaction data is introduced in this case, which improves representativeness of the interaction value, and improves an interaction frequency of virtual users in a target virtual region.

Figure 9:
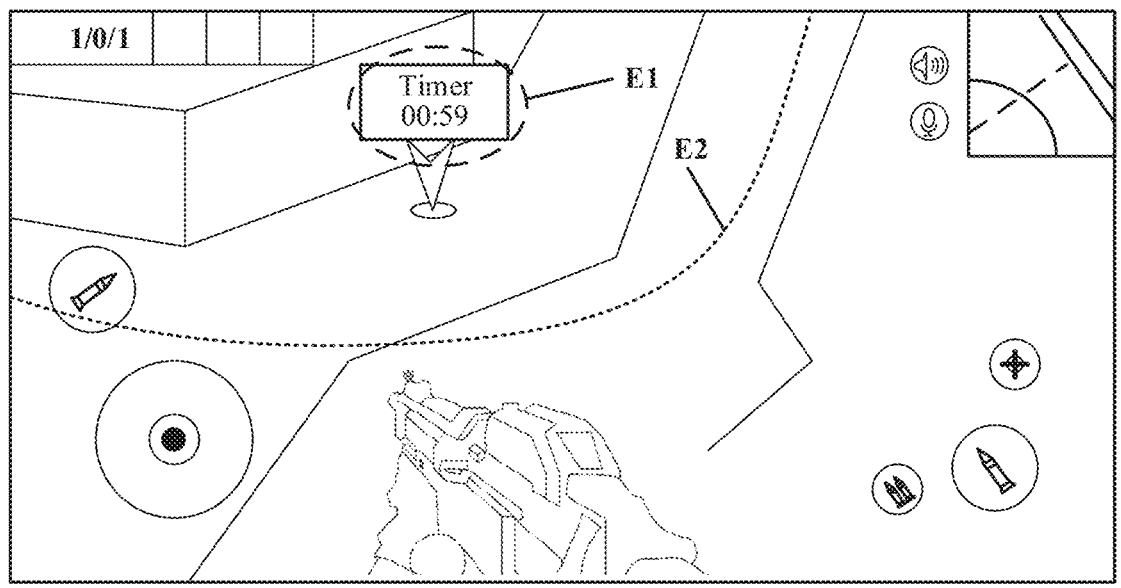
FIG. 9 is a schematic diagram of another scene of virtual object interaction according to an embodiment of this application.

Because the target interaction region has an update condition, that is, the target interaction region may be updated after existing for a certain duration, and the update condition may be displayed in a manner of a timer. In a case that a virtual object does not enter the target interaction region. FIG. 9 is a schematic diagram of another scene of virtual object interaction according to an embodiment of this application. The figure shows a timer E1 used for indicating a time of which the target interaction region has existed, an upper limit of the time being a valid time; and a boundary E2 of the target interaction region. In a case that the virtual object does not enter the boundary E2 of the target interaction region, the timer E1 used for indicating the time of which the target interaction region has existed may be generated in a direction of a target hotspot, which may prompt the virtual object for an orientation of the target interaction region and prompt the virtual object for a duration of which the target interaction region has appeared, so that the virtual object plans and refers to a travel route, and interaction efficiency between virtual objects is ensured.

Figure 10:
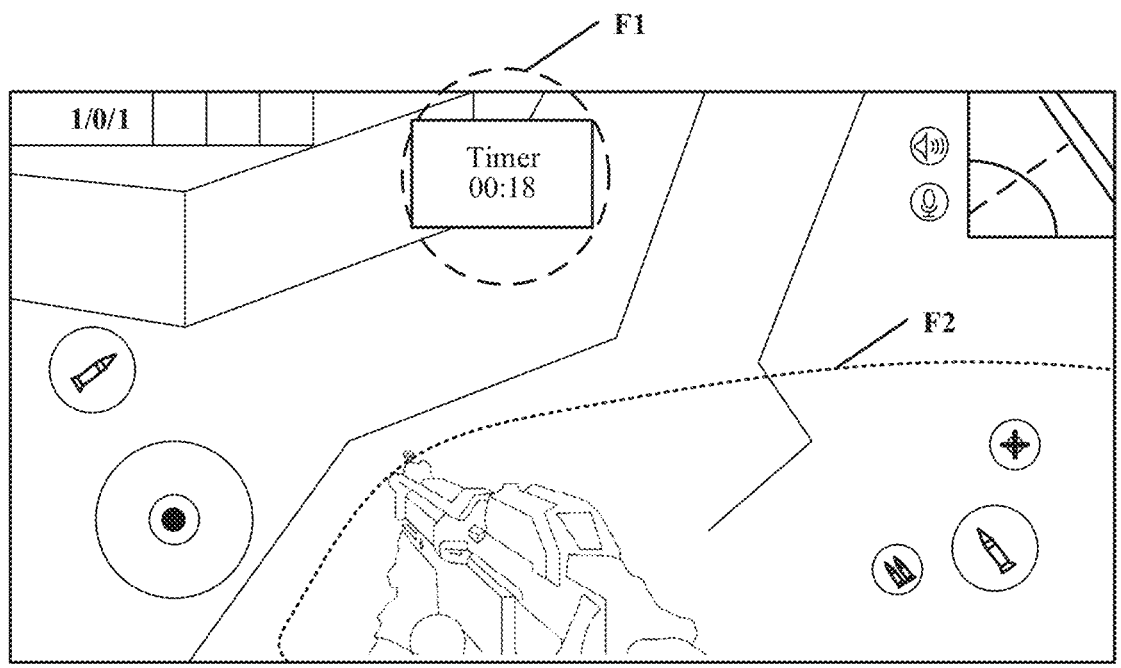
FIG. 10 is a schematic diagram of another scene of virtual object interaction according to an embodiment of this application.

In another scene, after a virtual object enters the target interaction region, a corresponding timer may also be generated. FIG. 10 is a schematic diagram of another scene of virtual object interaction according to an embodiment of this application. The figure shows a timer F1 after the virtual object enters the target interaction region, that is, a remaining time based on a countdown of the valid time; and a boundary F2 of the target interaction region. In a case that the virtual object enters the target interaction region, that is, after the boundary F2 of the target interaction region is triggered, the timer F1 may be displayed to reflect a remaining existence time of the target interaction region, so as to provide a virtual user with a reference for when to start position change, and improve user experience.

In some embodiments, a determination for which the virtual object enters the target interaction region may be performed based on triggering of a collision box. Specifically, a boundary collision box corresponding to the target interaction region is first determined; the boundary collision box is then triggered based on a target operation of a virtual object of a single camp, to start the timer shown in FIG. 10, where the timer is associated with an interaction value; and the interaction value is further determined according to an interaction duration indicated by the timer. The collision box is invisible in a view angle of a user, and a specific triggering process is obtained through calculation of the background, thereby ensuring simplicity of an interaction interface.

Figure 11:
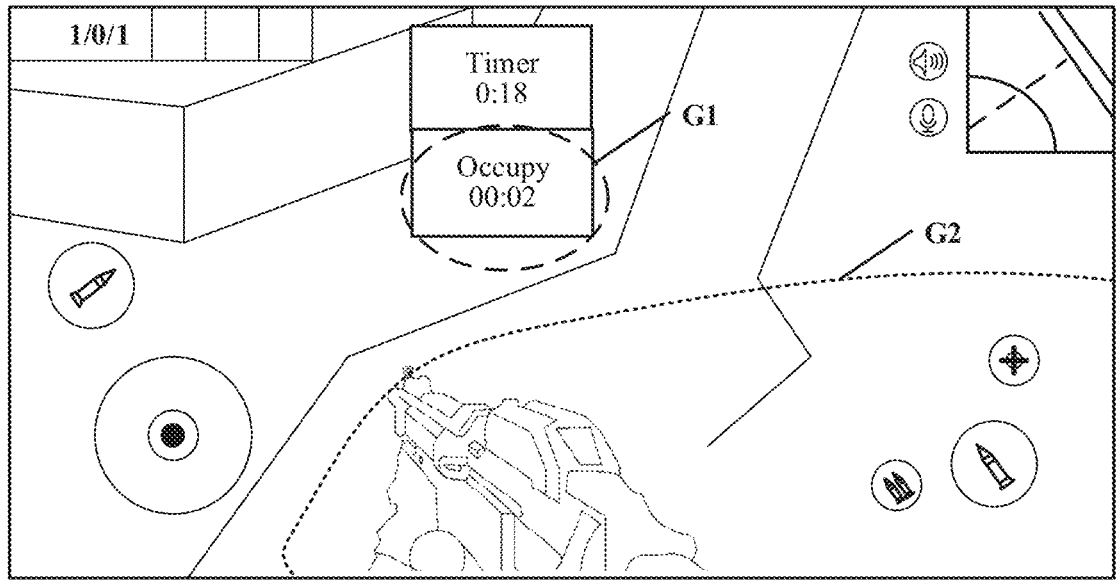
FIG. 11 is a schematic diagram of another scene of virtual object interaction according to an embodiment of this application.

Correspondingly, after the user triggers the collision box and enters the target interaction region, an occupancy duration may be counted to count the interaction value. FIG. 11 is a schematic diagram of another scene of virtual object interaction according to an embodiment of this application. In a case that there is no virtual object of another camp in the target interaction region after a virtual object enters the target interaction region, the figure may pop up occupancy timekeeping G1, namely, an occupancy time; and the user may know an occupancy duration in the target interaction region through the occupancy timekeeping G1, to have a preliminary determination on an interaction value. In addition, a boundary G2 of the target interaction region in this case may be highlighted, that is, it is prompted that the virtual user does not leave the region, thereby ensuring visibility of a virtual object interaction process.

In a virtual object occupancy process, the background may detect occupancy objects in the target interaction region in real time, and the occupancy objects are counted based on a camp of the virtual object. If the occupancy objects meet a stop threshold, the timer is stopped. The stop threshold is a quantity of camps existing in the target interaction region. Specifically, the stop threshold may be 2, that is, an interaction value may be obtained only when one camp occupies the target interaction region. The stop threshold may also be a numerical value greater than 2, that is, when more camps participate in a battle, a plurality of camps obtaining interaction values in the target interaction region may be set, for example: when there are thirty camps participating in a battle, the stop threshold may be set to 5, that is, virtual objects of at most four camps run in the target interaction region to obtain interaction values. A specific numerical value depends on an actual scene, which is not limited herein. By setting the stop threshold, interaction efficiency between the virtual objects is improved, and accuracy of the interaction value is ensured.

Figure 12:
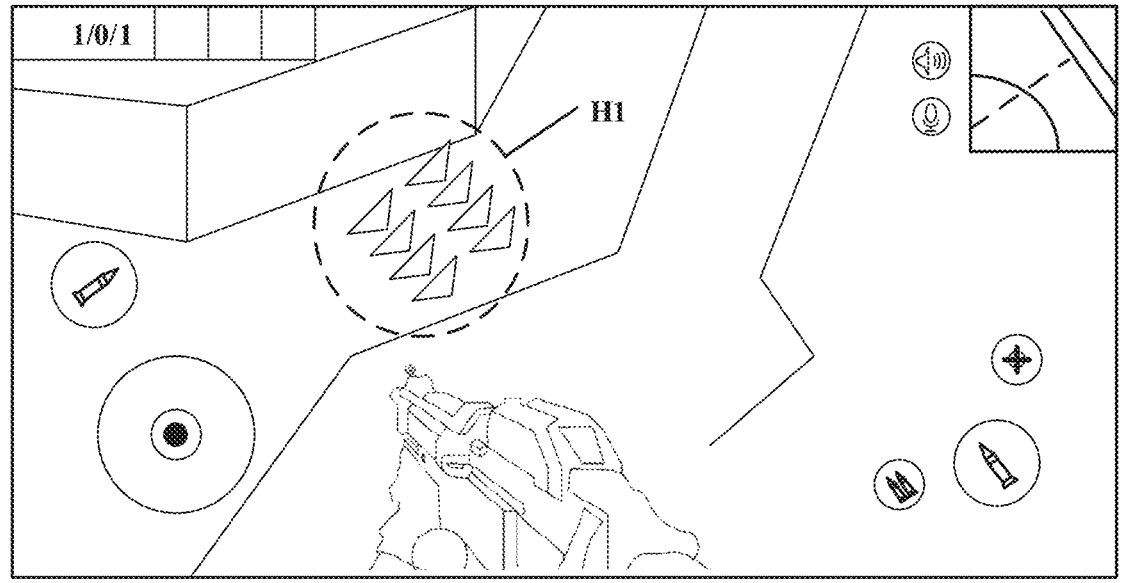
FIG. 12 is a schematic diagram of another scene of virtual object interaction according to an embodiment of this application.

In a possible scene, when a virtual object occupies the target interaction region, a first virtual element (for example, a flickering mask) used for prompting that a user has occupied may be invoked, that is, the first virtual element is invoked in response to starting of a timer, where the first virtual element is used for indicating that an interaction value has changed. The target virtual scene is then updated based on the first virtual element. Specifically. FIG. 12 is a schematic diagram of another scene of virtual object interaction according to an embodiment of this application. The figure shows a displayed first virtual element H1 after a user occupies the target interaction region, and the first virtual element H1 may have a prompt color element, for example, the first virtual element H1 is blue when the user occupies the target interaction region, and is red when a player of another camp enters the target interaction region, thereby improving the visibility of the target interaction region and ensuring concentration of the user.

Figure 13:
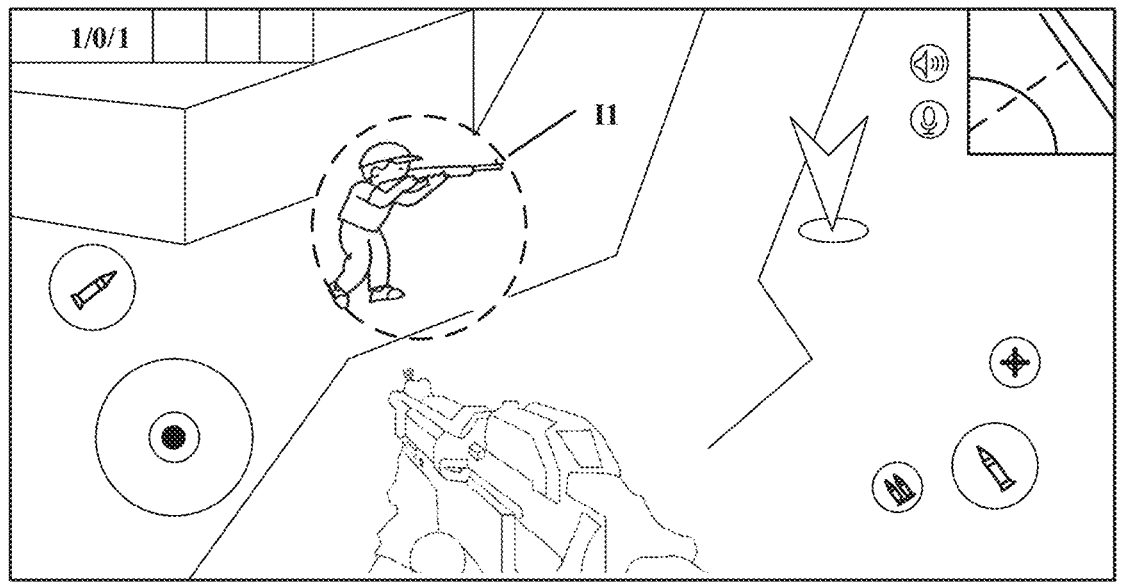
FIG. 13 is a schematic diagram of another scene of virtual object interaction according to an embodiment of this application.

In addition, after the virtual object of another camp enters the target interaction region, element interaction needs to be performed between the virtual objects, to obtain an interaction value again. Specifically. FIG. 13 is a schematic diagram of another scene of virtual object interaction according to an embodiment of this application. The figure shows a scene that a virtual object I1 of another camp enters the target interaction region, a current virtual object needs to eliminate the virtual object I1 of another camp, to continuously obtain an interaction value, thereby improving intensity of interaction between the virtual objects, and improving user experience.

303. Update the target interaction region in the target virtual scene when an existence time of the target interaction region reaches the valid time and the interaction value is lower than a preset value.

In this embodiment, an update process may be performed in the case that the existence time of the target interaction region reaches the valid time and the interaction value is lower than the preset value, so as to update the target interaction region, and display the updated target interaction region in the target virtual scene; and so as to further guide virtual objects to perform interaction operations based on guiding of the updated target interaction region. A duration corresponding to the existence time of the target interaction region reaching a duration corresponding to the valid time may also be understood as that a countdown based on the duration corresponding to the valid time is zero in a current time.

For a scene that the interaction value does not reach the preset value and the duration corresponding to the existence time of the target interaction region does not reach the duration corresponding to the valid time, the interaction operations may be performed continuously between the virtual objects. That is, a virtual object may continuously obtain the interaction value by occupying the target interaction region, and an operation of the virtual object is ended until the interaction value reaches the preset value, that is, a game battle in which the virtual object is manipulated is ended.

Further, the update process of the target interaction region may be performed when the interaction value does not reach the preset value and the duration corresponding to the existence time of the target interaction region reaches the duration corresponding to the valid time, where the preset value may be a numerical value, for example, the preset value is 150. Therefore, the preset value not being reached means that the interaction value does not reach 150. The preset value may alternatively indicate a difference value between interaction values of virtual objects of different camps, that is, the preset value not being reached means that the difference value between the interaction values of the virtual objects of different camps does not reach 100. A specific numerical value depends on an actual scene, which is not limited herein.

After it is determined that the interaction value does not reach the preset value and the duration corresponding to the existence time of the target interaction region reaches the duration corresponding to the valid time, the target interaction region may be updated. A specific update process may be to delete an original target interaction region in the target virtual scene, and then randomly generate one target interaction region in the target virtual scene. In another possible scene, positions of a plurality of target interaction regions may be preset, but each time only one target interaction region may be displayed in the target virtual scene, and switching is performed between the positions of the plurality of preset target interaction regions. Each of the preset target interaction regions is independent of each other, that is, the updated target interaction region does not have an associated relationship with other preset target interaction regions.

In some embodiments, to ensure that virtual objects need to move during switching the target interaction region, it may be set that the updated target interaction region does not include the virtual objects. Specifically, real-time position coordinates of the virtual objects in the target virtual scene are first determined; and then, region position coordinates of the target interaction region are updated based on the real-time position coordinates, and the target interaction region may be updated in a position indicated by the region position coordinates. That is, a region not including the virtual objects in the target virtual scene is selected to set the target interaction region, thereby ensuring that each of the virtual objects needs to move to obtain an interaction value, and improving interaction efficiency of the virtual objects.

Figure 14:
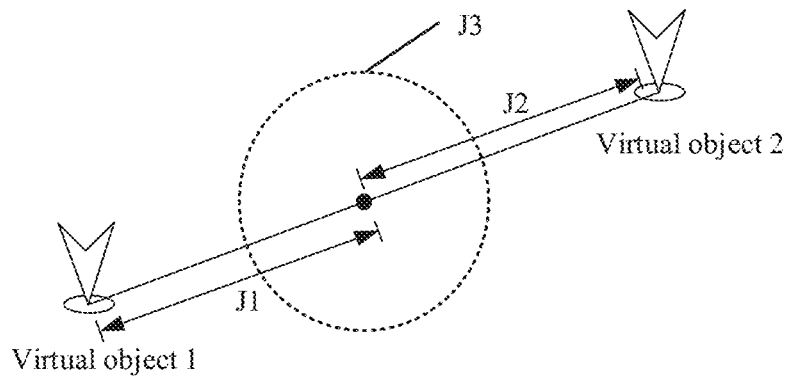
FIG. 14 is a schematic diagram of another scene of virtual object interaction according to an embodiment of this application.

In some embodiments, to ensure similarity of movement distances of the virtual objects, that is, to prevent the updated target interaction region from being too close to a virtual object, so as to facilitate the virtual object to obtain an interaction value and cause an imbalance of the interaction process, a process of updating the target interaction region shown in FIG. 14 may be used. FIG. 14 is a schematic diagram of another scene of virtual object interaction according to an embodiment of this application. The figure shows a direct distance J1 between a virtual object 1 and a center of an updated target interaction region, a direct distance J2 between a virtual object 2 and the center of the updated target interaction region, and an updated target interaction region J3. The direct distance J1 between the virtual object 1 and the center of the updated target interaction region and the direct distance J2 between the virtual object 2 and the center of the updated target interaction region are the same, that is, to determine the updated target interaction region J3, real-time positions of the virtual object 1 and the virtual object 2 are first determined, and then a center of a line connecting the virtual object 1 and the virtual object 2 is set as the center, so as to obtain the updated target interaction region 33. The updated target interaction region is generated by using the method, which ensures balance of the virtual object interaction process.

In some embodiments, because there may be obstacles in the target virtual scene, for example, impenetrable terrain, houses, walls, and other virtual elements, virtual users need to detour to reach the updated target interaction region in this case, so that travel distances of the virtual users are inconsistent. This application provides a manner of determining region position coordinates based on this, including: determining obstacle information surrounding the virtual objects according to the real-time position coordinates; generating route information based on distance weight information corresponding to the obstacle information, where the route information is used for indicating distances of the virtual objects from the updated target interaction region; and updating the region position coordinates of the target interaction region based on the route information.

Figure 15:
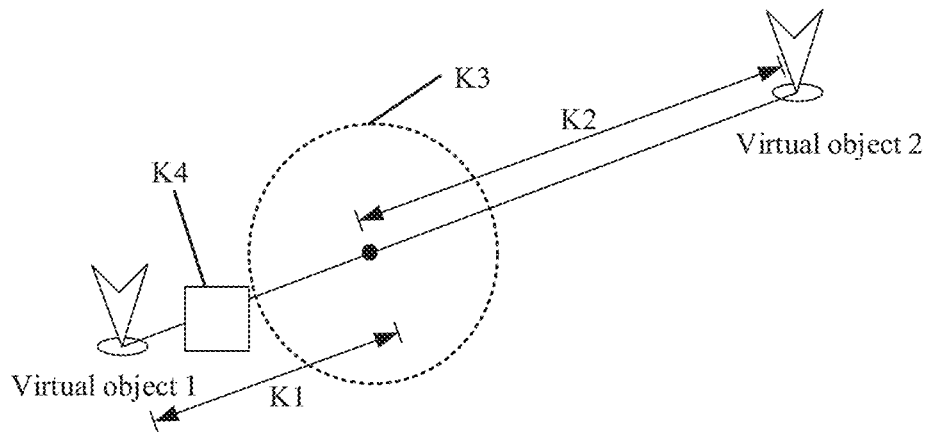
FIG. 15 is a schematic diagram of another scene of virtual object interaction according to an embodiment of this application.

In this case, a process of updating the target interaction region shown in FIG. 15 may be used. FIG. 15 is a schematic diagram of another scene of virtual object interaction according to an embodiment of this application. The figure shows a direct distance K1 between a virtual object 1 and a center of an updated target interaction region, a direct distance K2 between a virtual object 2 and the center of the updated target interaction region, an updated target interaction region K3, and an obstacle K4. It can be seen that, the direct distance K1 between the virtual object 1 and the center of the updated target interaction region is different from the direct distance K2 between the virtual object 2 and the center of the updated target interaction region, and there is the obstacle K4 between the virtual object 1 and the updated target interaction region. Specifically, the direct distance K2 between the virtual object 2 and the center of the updated target interaction region may be set farther. For example, K2 is set to 1.5 times of K1, to determine the target interaction region.

In a possible scene, there are two obstacles on a route between the virtual object 1 and a target hotspot, and there is no obstacle on a route between the virtual object 2 and the target hotspot. Therefore, allocation on a distance of the virtual object 1 from the target hotspot and a distance of the virtual object 2 from the target hotspot may be set as that the distance of the virtual object 2 is twice the distance of the virtual object 1. A specific numerical value transformation relationship depends on an actual scene, which is not limited herein. By setting weight information, fairness of the updated target interaction region relative to each of the virtual objects is guaranteed, and user experience is improved.

Figure 16:
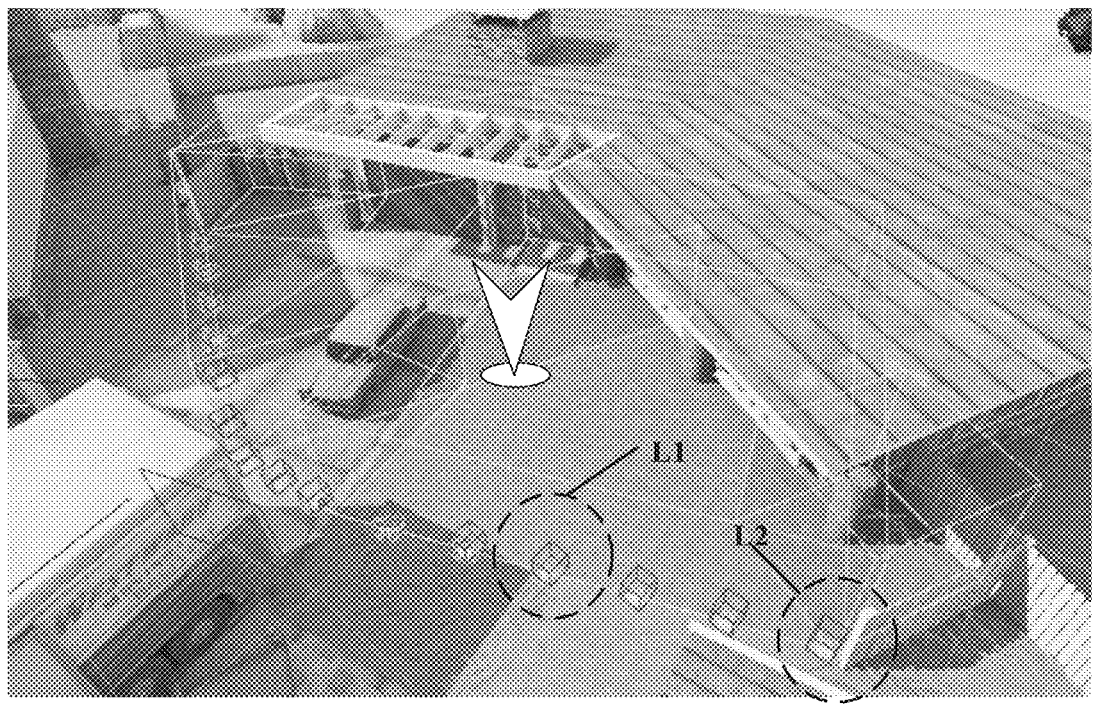
FIG. 16 is a schematic diagram of another scene of virtual object interaction according to an embodiment of this application.

Determination for entering the target interaction region is set based on a collision box, and in this case, if the collision box is set on an obstacle, a virtual object may not be able to enter the target interaction region. Therefore, obstacle information needs to be considered when setting the collision box. Specifically, during setting the collision box, the obstacle information in the target virtual scene is first determined; a boundary collision box is then adjusted based on the obstacle information, so that a region corresponding to the obstacle information does not include the boundary collision box. In a possible scene, FIG. 16 is a schematic diagram of another scene of virtual object interaction according to an embodiment of this application. The figure shows a collision box L1 of the target interaction region and a collision box L2 located around an obstacle. It can be seen that, there is a wall next to the collision box L2. In this case, the collision box is not set, and a virtual object needs to trigger the collision box L2 to obtain an interaction value, thereby ensuring smoothness of a foreground of the virtual object and avoiding occurrence of getting a loophole.

A process of obtaining obstacles and updating the collision boxes may be performed based on the process of obtaining the target virtual scene in step 301, that is, the obstacles are adjusted in the process of obtaining the target virtual scene; or be performed in a process of updating the target interaction region in this step, that is, surrounding obstacles are adjusted after the position of the updated target interaction region is determined.

In addition, for a scene that the interaction value reaches the preset value, that is, when the interaction value reaches the preset value, an interaction value corresponding to each virtual object is displayed, and an operation of the virtual object is ended, that is, a game battle in which the virtual object is manipulated is ended. The preset value may be a specific numerical value, for example, the preset value is 150. Therefore, the preset value being met means that the interaction value reaches 150. The preset value may alternatively indicate a difference value between interaction values of virtual objects of different camps, that is, the difference value between the interaction values of the virtual objects of different camps reaching 100 means that the preset value is reached. A specific numerical value depends on an actual scene, which is not limited herein.

Figure 17:
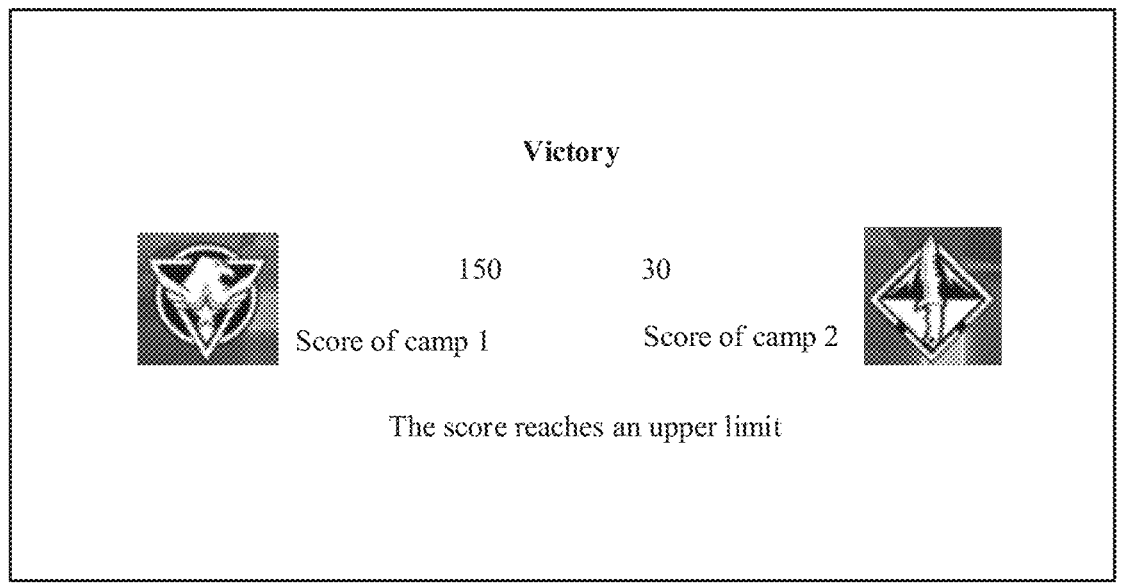
FIG. 17 is a schematic diagram of another scene of virtual object interaction according to an embodiment of this application.

In a possible scene, a score (an interaction value) of a camp reaches the target numerical value. In this case, once the camp reaches a threshold, an interface shown in FIG. 17 is popped up. FIG. 17 is a schematic diagram of another scene of virtual object interaction according to an embodiment of this application, and displays an obtaining situation of an interaction value corresponding to each virtual object, thereby prompting that a corresponding camp wins, and ending this game battle.

With reference to the foregoing embodiments, a target virtual scene is obtained, where the target virtual scene includes a virtual object and a target interaction region, and the target interaction region has a valid time; an interaction value is determined in response to a target operation of the virtual object in the target interaction region; and the target interaction region is further updated in the target virtual scene when an existence time of the target interaction region reaches the valid time and the interaction value is lower than a preset value. In this way, a continuous virtual element interaction process is achieved. Because virtual object interaction is only guided by switching the target interaction region in a virtual scene and a large quantity of virtual elements are not introduced, occupancy of resources in the virtual element interaction process is reduced, and stability of the virtual object interaction is improved.

Figure 18:
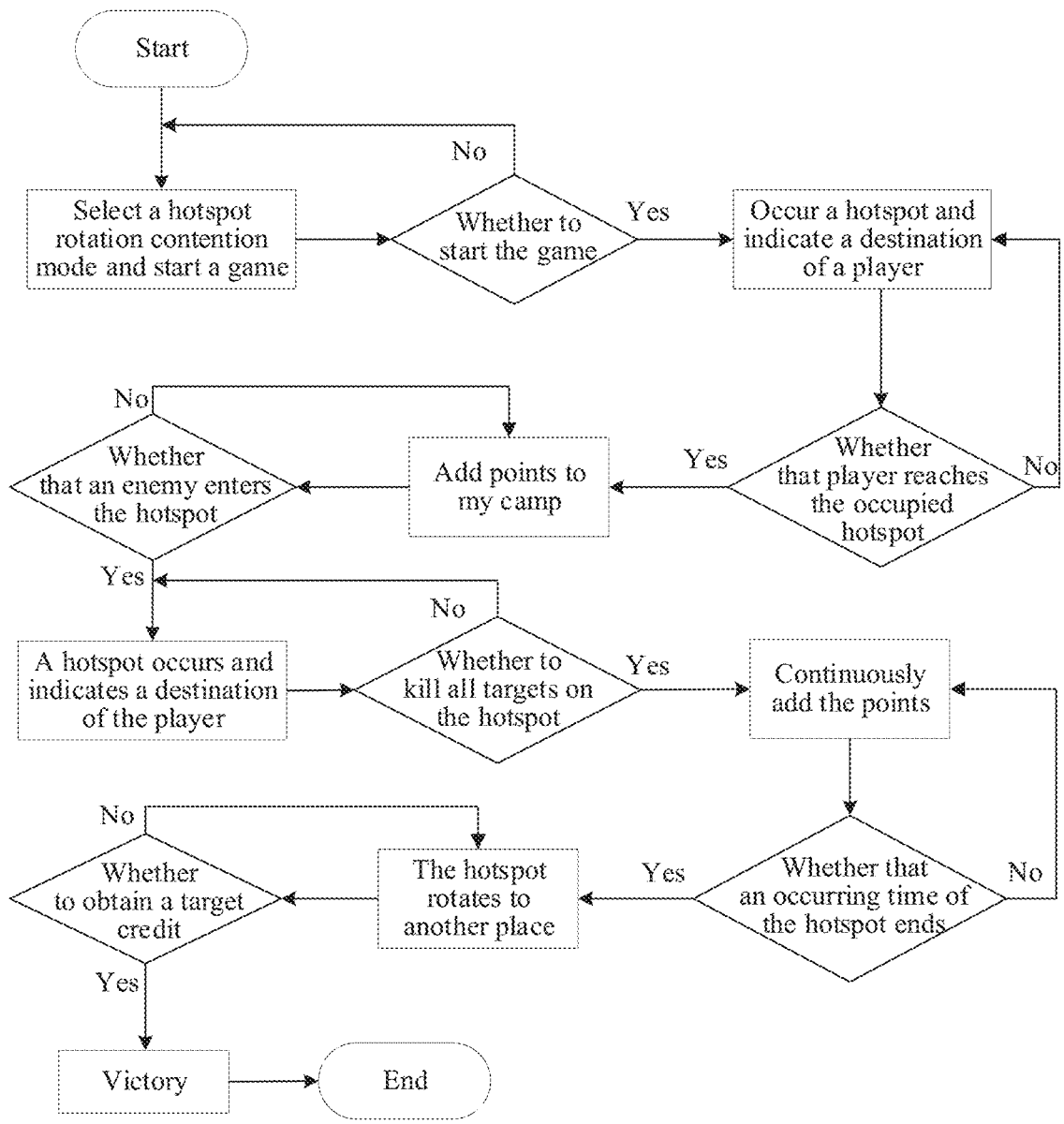
FIG. 18 is a flowchart of another virtual object interaction method according to an embodiment of this application.

The foregoing embodiments describe the virtual object interaction process. The following is a description with reference to a specific response process. FIG. 18 is a flowchart of another virtual element interaction method according to an embodiment of this application. First, a player needs to select a hotspot rotation contention mode in classic modes and enter a game. Then, when the game starts, a system may randomly generate a hotspot (a target interaction region), and display the hotspot in a minimap. Further, when the hotspot occurs, an approximate position of the hotspot may be displayed in the minimap, and a direction and a distance of the hotspot may also be displayed in a screen. In a case that the player occupies the hotspot, a score of a camp of the player increases, until the hotspot disappears or a hostile camp also occupies the hotspot. Finally, when a score obtained by any one party reaches a target score or a time of the game mode ends, the game is ended, and one party obtaining a higher score wins. Alternatively, if none of scores obtained by parties reaches the target score, the hotspot is switched to a next hotspot and the above interaction process is repeated.

With reference to the foregoing embodiments, dynamic generation of a hotspot improves interaction efficiency between virtual objects, and improves user experience.

Figure 19:
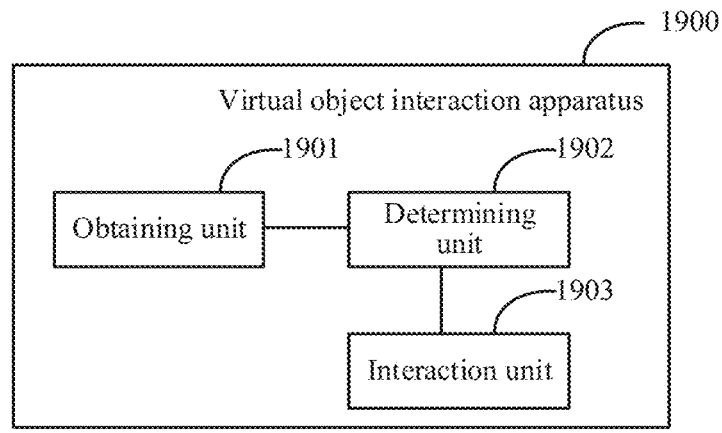
FIG. 19 is a schematic structural diagram of a virtual object interaction apparatus according to an embodiment of this application.

For the convenience of better implementing the foregoing solutions in the embodiments of this application, the following further provides a related apparatus configured to implement the foregoing solutions. FIG. 19 is a schematic structural diagram of a virtual object interaction apparatus according to an embodiment of this application. A virtual object interaction apparatus 1900 includes:
an obtaining unit 1901, configured to obtain a target virtual scene, the target virtual scene including a virtual object and a target interaction region, and the target interaction region having a valid time;
a determining unit 1902, configured to determine an interaction value in response to a target operation of the virtual object in the target interaction region; and
an interaction unit 1903, configured to update the target interaction region in the target virtual scene when an existence time of the target interaction region reaches the valid time and the interaction value is lower than a preset value.

In some embodiments, in some possible implementations of this application, the determining unit 1902 is specifically configured to determine occupancy information in response to the target operation of the virtual object in the target interaction region, the occupancy information being set based on an occupancy time of the virtual object in the target interaction region; and
the determining unit 1902 is specifically configured to determine the interaction value based on the occupancy information.

In some embodiments, in some possible implementations of this application, the determining unit 1902 is specifically configured to determine interaction data of the virtual object in the target interaction region; and
the determining unit 1902 is specifically configured to update the occupancy information based on the interaction data.

In some embodiments, in some possible implementations of this application, the determining unit 1902 is specifically configured to determine a boundary collision box corresponding to the target interaction region;
the determining unit 1902 is specifically configured to trigger the boundary collision box based on the target operation of the virtual object of a single camp, to start a timer; and
the determining unit 1902 is specifically configured to determine the occupancy information according to the occupancy time indicated by the timer.

In some embodiments, in some possible implementations of this application, the determining unit 1902 is specifically configured to detect occupancy objects in the target interaction region, the occupancy objects being used for identifying camp counts based on the virtual object, and
the determining unit 1902 is specifically configured to stop the timer when a quantity of the camp counts identified by the occupancy objects meets a stop threshold.

In some embodiments, in some possible implementations of this application, the determining unit 1902 is specifically configured to invoke a first virtual element in response to starting of the timer, the first virtual element being used for indicating a change of the interaction value; and
the determining unit 1902 is specifically configured to update the target interaction region based on the first virtual element.

In some embodiments, in some possible implementations of this application, the interaction unit 1903 is specifically configured to determine real-time position coordinates of the virtual object in the target virtual scene; and
the interaction unit 1903 is specifically configured to update region position coordinates of the target interaction region based on the real-time position coordinates, to update the target interaction region in the region position coordinates, the updated target interaction region not including the virtual object.

In some embodiments, in some possible implementations of this application, the interaction unit 1903 is specifically configured to determine obstacle information surrounding the virtual object according to the real-time position coordinates;

the interaction unit 1903 is specifically configured to generate route information based on distance weight information corresponding to the obstacle information, the route information being used for indicating a distance of the virtual object from the updated target interaction region; and the interaction unit 1903 is specifically configured to update the region position coordinates of the target interaction region based on the route information.

In some embodiments, in some possible implementations of this application, the obtaining unit 1901 is specifically configured to determine a candidate virtual scene in response to a selection instruction;

the obtaining unit 1901 is specifically configured to generate a target hotspot based on the candidate virtual scene;

the obtaining unit 1901 is specifically configured to generate the target interaction region according to the target hotspot; and the obtaining unit 1901 is specifically configured to deploy the target interaction region in the candidate virtual scene based on the target hotspot, to determine the target virtual scene.

In some embodiments, in some possible implementations of this application, the obtaining unit 1901 is specifically configured to generate prompt information based on the target hotspot, the prompt information being used for indicating a direction or a distance; and the obtaining unit 1901 is specifically configured to update a second virtual element in the target virtual scene according to the prompt information, the second virtual element being used for guiding the virtual object to approach the target interaction region.

In some embodiments, in some possible implementations of this application, the obtaining unit 1901 is specifically configured to determine an indication direction and position coordinates of the virtual object, the indication direction being used for indicating a first direction line toward which the virtual object faces;

the obtaining unit 1901 is specifically configured to generate a second direction line based on the position coordinates and the target hotspot; and the obtaining unit 1901 is specifically configured to generate the prompt information based on the first direction line and the second direction line.

In some embodiments, in some possible implementations of this application, the obtaining unit 1901 is specifically configured to determine position information of the target hotspot in a third virtual element, the third virtual element being used for guiding the virtual object to approach the target interaction region;

the obtaining unit 1901 is specifically configured to determine position coordinates of the virtual object in the third virtual element; and the obtaining unit 1901 is specifically configured to determine the prompt information based on the position information and the position coordinates of the virtual object in the third virtual element.

A target virtual scene is obtained, where the target virtual scene includes a virtual object and a target interaction region, and the target interaction region has a valid time; an interaction value is then determined in response to a target operation of the virtual object in the target interaction region; and the target interaction region is further updated in the target virtual scene when an existence time of the target interaction region reaches the valid time and the interaction value is lower than a preset value. In this way, a continuous virtual element interaction process is achieved. Because virtual object interaction is only guided by switching the target interaction region in a virtual scene and a large quantity of virtual elements are not introduced, occupancy of resources in the virtual element interaction process is reduced, and stability of the virtual object interaction is improved.

Figure 20:
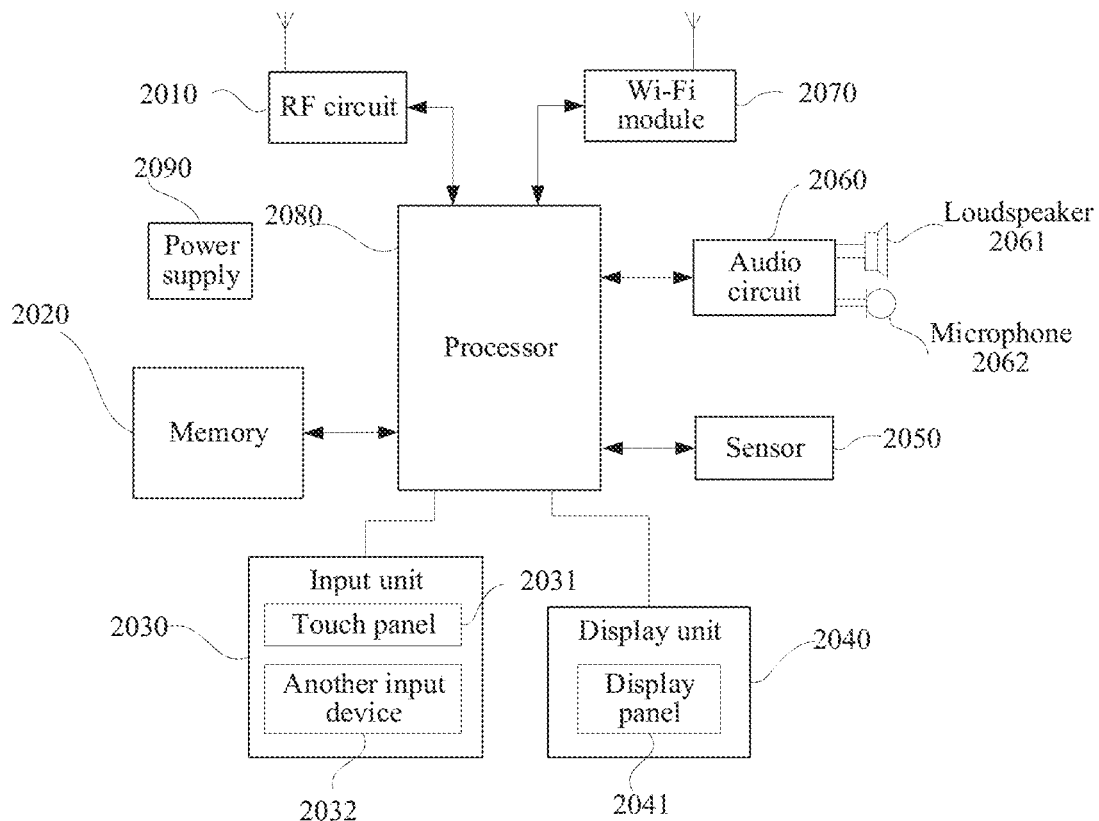
FIG. 20 is a schematic structural diagram of a terminal device according to an embodiment of this application.

An embodiment of this application further provides a terminal device. FIG. 20 is a schematic structural diagram of a terminal device according to an embodiment of this application. For ease of description, only parts related to the embodiments of this application are shown. For specific technical details that are not disclosed, refer to the method part in the embodiments of this application. The terminal device may be any terminal device including a mobile phone, a tablet computer, a personal digital assistant (PDA), a point of sales (POS), and an on-board computer, and the terminal device being a mobile phone is used as an example.

FIG. 20 is a block diagram of a structure of a part of a mobile phone related to a terminal according to an embodiment of this application. Referring to FIG. 20, the mobile phone includes components such as a radio frequency (RF) circuit 2010, a memory 2020, an input unit 2030, a display unit 2040, a sensor 2050, an audio circuit 2060, a wireless fidelity (Wi-Fi) module 2070, a processor 2080, and a power supply 2090. A person skilled in the art may understand that the structure of the mobile phone shown in FIG. 20 does not constitute a limitation on the mobile phone, and the mobile phone may include more or fewer components than those shown in the figure, or some components may be combined, or a different component deployment may be used.

The following makes a detailed description of the components of the mobile phone with reference to FIG. 20.

The RF circuit 2010 may be configured to receive and send a signal in an information receiving and sending process or a call process, and in particular, after downlink information of a base station is received, send the downlink information to the processor 2080 for processing. In addition, the RF circuit transmits uplink data to the base station. Usually, the RF circuit 2010 includes, but is not limited to, an antenna, at least one amplifier, a transceiver, a coupler, a low noise amplifier (LNA), and a duplexer. In addition, the RF circuit 2010 may also communicate with a network and another device by wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 2020 may be configured to store a software program and a module. The processor 2080 runs the software program and the module that are stored in the memory 2020, to perform various functional applications and data processing of the mobile phone. The memory 2020 may mainly include a program storage region and a data storage region. The program storage region may store an operating system, an application program required by at least one function (for example, a sound playback function and an image playback function), or the like. The data storage region may store data (for example, audio data and a phone book) created according to use of the mobile phone. In addition, the memory 2020 may include a high speed random access memory, and may further include a non-volatile memory, such as at least one magnetic disk storage device, a flash memory device or other non-volatile solid state storage devices.

The input unit 2030 may be configured to receive input digit or character information, and generate a keyboard signal input related to the user setting and function control of the mobile phone. Specifically, the input unit 2030 may include a touch panel 2031 and another input device 2032. The touch panel 2031, which may also be referred to as a touchscreen, may collect a touch operation of a user on or near the touch panel (such as an operation of a user on or near the touch panel 2031, and an air touch operation of the user within a certain range on the touch panel 2031 by using any suitable object or accessory such as a finger or a stylus), and drive a corresponding connection apparatus according to a preset program. In some embodiments, the touch panel 2031 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 2080, and receives and executes a command transmitted by the processor 2080. In addition, the touch panel 2031 may be implemented by using various types, such as a resistive type, a capacitive type, an infrared type, and a surface acoustic wave type. In addition to the touch panel 2031, the input unit 2030 may further include another input device 2032. Specifically, another input device 2032 may include, but is not limited to, one or more of a physical keyboard, a functional key (such as a volume control key or a switch key), a track ball, a mouse, and a joystick.

The display unit 2040 may be configured to display information inputted by the user or information provided for the user, and various menus of the mobile phone. The display unit 2040 may include a display panel 2041. In some embodiments, the display panel 2041 may be configured by using a liquid crystal display (LCD), an organic light-emitting diode (OLED), or the like. Further, the touch panel 2031 may cover the display panel 2041. After detecting a touch operation on or near the touch panel 2031, the touch panel 2031 transfers the touch operation to the processor 2080, to determine a type of a touch event. Then, the processor 2080 provides a corresponding visual output on the display panel 2041 according to the type of the touch event. Although in FIG. 20, the touch panel 2031 and the display panel 2041 are used as two separate parts to implement input and output functions of the mobile phone, in some embodiments, the touch panel 2031 and the display panel 2041 may be integrated to implement the input and output functions of the mobile phone.

The mobile phone may further include at least one sensor 2050 such as an optical sensor, a motion sensor, and other sensors. Specifically, the optical sensor may include an ambient light sensor and a proximity sensor. The ambient light sensor may adjust luminance of the display panel 2041 according to brightness of the ambient light. The proximity sensor may switch off the display panel 2041 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

Wi-Fi belongs to a short distance wireless transmission technology. The mobile phone may help, by using the Wi-Fi module 2070, a user to receive and transmit an email, browse a web page, access stream media, and the like. This provides wireless broadband Internet access for the user. Although FIG. 20 shows the Wi-Fi module 2070, the Wi-Fi module is not a necessary component of the mobile phone, and the Wi-Fi module may be omitted as required provided that the scope of the essence of the present disclosure is not changed.

The processor 2080 is a control center of the mobile phone, and is connected to various parts of the entire mobile phone by using various interfaces and lines. By running or executing a software program and/or module stored in the memory 2020, and invoking data stored in the memory 2020, the processor executes various functions of the mobile phone and performs data processing, thereby monitoring the entire mobile phone. In some embodiments, the processor 2080 may include one or more processing units, the processor 2080 may integrate an application processor and a modem. The application processor mainly processes an operating system, a user interface, an application program, and the like. The modem mainly processes wireless communication. It may be understood that the foregoing modem may not be integrated into the processor 2080.

The processor 2080 is specifically configured to obtain a target virtual scene, where the target virtual scene includes virtual objects of at least two camps, the target virtual scene includes at least two target interaction regions independent of each other, the target interaction regions are switched in the target virtual scene according to an update condition, and the target interaction regions are used for guiding the virtual objects to perform object interaction in a valid time.

The processor 2080 is specifically configured to determine interaction values in response to target operations of the virtual objects in the target interaction regions, where the interaction values are obtained based on occupancy information of the virtual objects in the target interaction regions, and the occupancy information is used for indicating occupancy situations of the virtual objects of single camps in the target interaction regions.

The processor 2080 is specifically configured to determine a corresponding interaction process based on interaction information, where the interaction process includes switching of the target interaction regions or ending of the operations of the virtual objects.

Although not shown in the figure, the mobile phone may further include a camera, a Bluetooth module, and the like, and details are not described herein.

In the embodiments of this application, the processor 2080 included in the terminal further has functions of performing steps of the foregoing page processing method.

An embodiment of this application further provides a computer-readable storage medium, storing a computer program, the computer program being configured to perform the steps performed by the virtual object interaction apparatus in the method described in the embodiments shown in FIG. 3 to FIG. 18.

An embodiment of this application further provides a computer program product, including virtual object interaction instructions, the computer program product, when run on a computer, causing the computer to perform the steps performed by the virtual object interaction apparatus in the method described in the embodiments shown in FIG. 3 to FIG. 18.

An embodiment of this application further provides a virtual object interaction system, and the virtual object interaction system may include the virtual object interaction apparatus in the embodiment shown in FIG. 19, or the terminal device shown in FIG. 20.

The virtual object interaction system is specifically configured to obtain a target virtual scene, where the target virtual scene includes virtual objects of at least two camps, the target virtual scene includes at least two target interaction regions independent of each other, the target interaction regions are switched in the target virtual scene according to an update condition, and the target interaction regions are used for guiding the virtual objects to perform object interaction in a valid time.

The virtual object interaction system is specifically configured to determine interaction values in response to target operations of the virtual objects in the target interaction regions, where the interaction values are obtained based on occupancy information of the virtual objects in the target interaction regions, and the occupancy information is used for indicating occupancy situations of the virtual objects of single camps in the target interaction regions.

The virtual object interaction system is specifically configured to determine a corresponding interaction process based on interaction information, where the interaction process includes switching of the target interaction regions or ending of the operations of the virtual objects.

A person skilled in the art can clearly understand that for convenience and conciseness of description, for specific working processes of the foregoing described system, apparatus and unit, refer to the corresponding processes in the foregoing method embodiments, and details are not described herein.

In the several embodiments provided in this application, the disclosed system, apparatus, and method may be implemented in other manners. For example, the described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or the entire or some of the technical solutions may be implemented in a form of a software product. The computer software product is stored in a storage medium and includes several instructions for instructing a computer device (which may be a PC, a virtual object interaction apparatus, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc. In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing embodiments are merely intended for describing the technical solutions of this application, but not for limiting this application. It is to be understood by a person of ordinary skill in the art that although this application has been described in detail with reference to the foregoing embodiments, modifications can be made to the technical solutions described in the foregoing embodiments, or equivalent replacements can be made to some technical features in the technical solutions, without departing from the spirit and scope of the technical solutions of the embodiments of this application.

What is claimed is:

1. A virtual object interaction method performed by a computer device, the method comprising:
   displaying a target virtual scene for an adversarial game between at least two virtual objects, the target virtual scene comprising a target interaction region, including:
   determining a candidate virtual scene in response to a user selection instruction;
   randomly generating a target hotspot based on the candidate virtual scene;
   generating the target interaction region according to the target hotspot; and
   deploying the target interaction region in the candidate virtual scene based on the target hotspot, to determine the target virtual scene;
   increasing an interaction value associated with a first virtual object of the at least two virtual objects in response to the first virtual object occupying the target interaction region; and
   determining a game outcome based on the interaction value associated with the first virtual object.

2. The method according to claim 1, wherein the method further comprising:
updating the target interaction region in the target virtual scene when an existence time of the target interaction region reaches a valid time and the interaction value associated with the first virtual object is lower than a preset value.

3. The method according to claim 2, wherein the updating the target interaction region in the target virtual scene comprises:
determining real-time position coordinates of the first virtual object in the target virtual scene; and
updating region position coordinates of the target interaction region based on the real-time position coordinates, to update the target interaction region in the region position coordinates, such that the first virtual object is outside the updated target interaction region.

4. The method according to claim 3, wherein the updating region position coordinates of the target interaction region based on the real-time position coordinates comprises:
determining obstacle information surrounding the first virtual object according to the real-time position coordinates;
generating route information based on distance weight information corresponding to the obstacle information, the route information being used for indicating a distance of the first virtual object from the updated target interaction region; and
updating the region position coordinates of the target interaction region based on the route information.

5. The method according to claim 1, wherein the method further comprising:
removing the first virtual object from the target interaction region in the target virtual scene when a health point value associated with the first virtual object is below a threshold.

6. The method according to claim 1, wherein the increasing an interaction value associated with a first virtual object of the at least two virtual objects in response to the first virtual object occupying the target interaction region comprises:
determining occupancy information in response to a target operation of the first virtual object occupying the target interaction region, the occupancy information being set based on an occupancy time of the first virtual object in the target interaction region; and
increasing the interaction value associated with the first virtual object based on the occupancy information.

7. The method according to claim 6, further comprising:
determining interaction data of the first virtual object occupying the target interaction region; and
updating the occupancy information based on the interaction data.

8. The method according to claim 6, wherein the determining occupancy information in response to the target operation of the first virtual object occupying the target interaction region comprises:
determining a boundary collision box corresponding to the target interaction region;
starting a timer for the target interaction region when the target operation of the first virtual object triggers the boundary collision box; and
determining the occupancy information according to the occupancy time indicated by the timer.

9. The method according to claim 8, further comprising:
detecting occupancy objects in the target interaction region, the occupancy objects being used for identifying a camp count based on the first virtual object; and
stopping the timer when a quantity of the camp count identified by the occupancy objects meets a stop threshold.

10. The method according to claim 8, further comprising:
invoking a first virtual element in response to starting of the timer, the first virtual element being used for indicating a change of the interaction value; and
updating the target interaction region based on the first virtual element.

11. The method according to claim 1, further comprising:
generating prompt information based on the target hotspot, the prompt information being used for indicating a direction or a distance; and
updating a second virtual element in the target virtual scene according to the prompt information, the second virtual element being used for guiding the first virtual object to approach the target interaction region.

12. The method according to claim 11, wherein the generating prompt information based on the target hotspot comprises:
determining an indication direction and position coordinates of the first virtual object, the indication direction being used for indicating a first direction line toward which the first virtual object faces;
generating a second direction line based on the position coordinates and the target hotspot; and
generating the prompt information based on the first direction line and the second direction line.

13. The method according to claim 11, wherein the generating prompt information based on the target hotspot comprises:
determining position information of the target hotspot in a third virtual element, the third virtual element being used for guiding the first virtual object to approach the target interaction region;
determining position coordinates of the first virtual object in the third virtual element; and
determining the prompt information based on the position information and the position coordinates of the first virtual object in the third virtual element.

14. A computer device, comprising a processor and a memory,
the memory being configured to store program code, and the processor being configured to execute the program code to perform a virtual object interaction method including:
displaying a target virtual scene for an adversarial game between at least two virtual objects, the target virtual scene comprising a target interaction region, including:
determining a candidate virtual scene in response to a user selection instruction;
randomly generating a target hotspot based on the candidate virtual scene;
generating the target interaction region according to the target hotspot; and
deploying the target interaction region in the candidate virtual scene based on the target hotspot, to determine the target virtual scene;
increasing an interaction value associated with a first virtual object of the at least two virtual objects in response to the first virtual object occupying the target interaction region; and
determining a game outcome based on the interaction value associated with the first virtual object.

15. The computer device according to claim 14, wherein the method further comprising:
   updating the target interaction region in the target virtual scene when an existence time of the target interaction region reaches a valid time and the interaction value associated with the first virtual object is lower than a preset value.

16. The computer device according to claim 14, wherein the method further comprising:
   removing the first virtual object from the target interaction region in the target virtual scene when a health point value associated with the first virtual object is below a threshold.

17. The computer device according to claim 14, wherein the increasing an interaction value associated with a first virtual object of the at least two virtual objects in response to the first virtual object occupying the target interaction region comprises:
   determining occupancy information in response to a target operation of the first virtual object occupying the target interaction region, the occupancy information being set based on an occupancy time of the first virtual object in the target interaction region; and
   increasing the interaction value associated with the first virtual object based on the occupancy information.

18. A non-transitory computer-readable storage medium, storing program code, the program code, when executed by a processor of a computer device, causing the computer device to perform a virtual object interaction method including:
   displaying a target virtual scene for an adversarial game between at least two virtual objects, the target virtual scene comprising a target interaction region, including:
      determining a candidate virtual scene in response to a user selection instruction;
      randomly generating a target hotspot based on the candidate virtual scene;
      generating the target interaction region according to the target hotspot; and
      deploying the target interaction region in the candidate virtual scene based on the target hotspot, to determine the target virtual scene;
   increasing an interaction value associated with a first virtual object of the at least two virtual objects in response to the first virtual object occupying the target interaction region; and
   determining a game outcome based on the interaction value associated with the first virtual object.

* * * * *